(12) United States Patent
Egawa et al.

(10) Patent No.: US 11,364,569 B2
(45) Date of Patent: Jun. 21, 2022

(54) METAL MEMBER AND METHOD OF MANUFACTURING THE SAME

(71) Applicant: TOYOTA JIDOSHA KABUSHIKI KAISHA, Toyota (JP)

(72) Inventors: Tetsuji Egawa, Okazaki (JP); Eita Niisato, Toyota (JP); Jun Kitagawa, Seto (JP); Masahiro Onoda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 518 days.

(21) Appl. No.: 15/975,905

(22) Filed: May 10, 2018

(65) Prior Publication Data

US 2018/0369958 A1     Dec. 27, 2018

(30) Foreign Application Priority Data

Jun. 21, 2017   (JP) .............................. JP2017-121457

(51) Int. Cl.
*B23K 26/26*     (2014.01)
*B23K 9/025*     (2006.01)
(Continued)

(52) U.S. Cl.
CPC .............. *B23K 26/26* (2013.01); *B23K 9/025* (2013.01); *B23K 26/0093* (2013.01);
(Continued)

(58) Field of Classification Search
CPC ........ B23K 26/28; B23K 26/26; B23K 33/00; B23K 9/025; B23K 26/0093; B23K 28/02;
(Continued)

(56) References Cited

U.S. PATENT DOCUMENTS 1,450,935 A * 4/1923 Anderson ............ B23K 33/006
                                                  403/270
4,336,441 A * 6/1982 Godai ..................... B23K 9/23
                                                  219/137 WM
(Continued)

FOREIGN PATENT DOCUMENTS

CN       101670812 A    3/2010
CN       102386360 A    3/2012
(Continued)

OTHER PUBLICATIONS

Partial English Translation of Russian Office Action dated Jan. 21, 2019 in Patent Application No. 2018117455/02(027165), 6 pages.
(Continued)

*Primary Examiner* — Eric S Stapleton
(74) *Attorney, Agent, or Firm* — Oblon, McClelland, Maier & Neustadt, L.L.P.

(57) ABSTRACT

A metal member includes a first plate, and a second plate abutting against and welded to the first plate in at least one butt portion. In the butt portion, a length from a first end to a second end of a welding boundary line between the first plate and the second plate is longer than a length of a straight line connecting the first end to the second end of the welding boundary line.

8 Claims, 14 Drawing Sheets

(51) Int. Cl.
| | | |
|---|---|---|
| *B23K 33/00* | (2006.01) | |
| *B23P 15/00* | (2006.01) | |
| *B23K 26/28* | (2014.01) | |
| *B23K 26/60* | (2014.01) | |
| *B23K 26/00* | (2014.01) | |
| *B23K 28/02* | (2014.01) | |
| *B23K 101/18* | (2006.01) | |
| *B23K 103/04* | (2006.01) | |

(52) U.S. Cl.
CPC .............. *B23K 26/28* (2013.01); *B23K 26/60* (2015.10); *B23K 28/02* (2013.01); *B23K 33/00* (2013.01); *B23K 33/002* (2013.01); *B23P 15/00* (2013.01); *B23K 2101/18* (2018.08); *B23K 2103/04* (2018.08)

(58) Field of Classification Search
CPC .. B23K 26/60; B23K 33/002; B23K 2101/18; B23K 2103/04; B23P 15/00
USPC .................................................... 219/121.64
See application file for complete search history.

(56) References Cited

U.S. PATENT DOCUMENTS

| | | | | |
|---|---|---|---|---|
| 4,345,360 A * | 8/1982 | Ridout | .................... | B23P 15/00 29/894.324 |
| 4,866,242 A * | 9/1989 | Martyr | ................. | B23K 26/123 219/121.64 |
| 4,935,029 A * | 6/1990 | Matsutani | .............. | B23K 26/28 606/223 |
| 5,595,670 A * | 1/1997 | Mombo-Caristan | ......................... | B23K 15/006 219/121.64 |
| 5,603,853 A * | 2/1997 | Mombo-Caristan | ......................... | B23K 15/006 219/121.64 |
| 5,624,585 A * | 4/1997 | Haruta | ................... | B23K 26/26 219/121.63 |
| 5,925,268 A * | 7/1999 | Britnell | ................ | B23K 26/032 219/121.63 |
| 6,052,424 A * | 4/2000 | Koizumi | .................. | G21B 1/25 376/150 |
| 6,336,583 B1 * | 1/2002 | Wang | ...................... | B23K 33/00 228/175 |
| 6,579,626 B1 * | 6/2003 | Ottinger | ................ | B23K 11/02 428/626 |
| 2001/0007331 A1 * | 7/2001 | Iwago | ...................... | B23K 9/04 228/163 |
| 2001/0011671 A1 * | 8/2001 | Aota | .................. | B23Q 3/15526 228/112.1 |
| 2002/0104833 A1 * | 8/2002 | Bradley | ............. | B23K 26/0884 219/121.63 |
| 2003/0102591 A1 * | 6/2003 | Thielman | ................ | B29C 43/26 264/166 |
| 2004/0016132 A1 * | 1/2004 | Dion | ...................... | B23D 65/00 30/350 |
| 2004/0067373 A1 * | 4/2004 | Kennedy | ................. | E04C 2/384 428/457 |
| 2004/0169062 A1 * | 9/2004 | Maruyama | ........... | B23K 9/0356 228/173.1 |
| 2004/0231283 A1 * | 11/2004 | LaSusa | ................. | B29C 53/066 52/745.19 |
| 2005/0061786 A1 * | 3/2005 | Saito | ...................... | B23K 31/02 219/121.64 |
| 2006/0278618 A1 * | 12/2006 | Forrest | ............... | B23K 26/0608 219/121.64 |
| 2007/0044406 A1 * | 3/2007 | Van Aken | .......... | B23K 20/1265 52/459 |
| 2007/0148488 A1 * | 6/2007 | Gutermuth | ............. | B21D 47/04 428/592 |
| 2007/0163121 A1 * | 7/2007 | Keys | ...................... | B21D 35/00 29/897.2 |
| 2007/0214998 A1 * | 9/2007 | Komaki | ............... | B23K 26/037 105/396 |
| 2008/0050205 A1 * | 2/2008 | Boltshauser | ........... | B23K 26/28 413/1 |
| 2009/0200359 A1 * | 8/2009 | Chen | .................... | B23K 20/126 228/112.1 |
| 2009/0280349 A1 * | 11/2009 | Bittendorfer | ........ | B23K 26/242 428/594 |
| 2009/0305075 A1 * | 12/2009 | Flehmig | ............... | B23K 26/262 428/603 |
| 2010/0055488 A1 * | 3/2010 | Gress | ..................... | B21D 22/20 428/571 |
| 2011/0170946 A1 * | 7/2011 | Schneegans | ......... | B23K 1/0056 403/271 |
| 2012/0015212 A1 * | 1/2012 | Karimine | ................ | E01B 11/46 428/681 |
| 2012/0240508 A1 * | 9/2012 | Maisch | .................... | E04C 3/086 52/588.1 |
| 2013/0248493 A1 * | 9/2013 | Helmrich | .............. | B23K 9/0052 219/61 |
| 2013/0270246 A1 * | 10/2013 | Okazaki | ............. | B23K 35/0261 219/137 WM |
| 2014/0076866 A1 * | 3/2014 | Gramsch | ............. | B23K 26/244 219/121.64 |
| 2014/0147693 A1 * | 5/2014 | Yasuyama | ............ | B62D 21/157 428/594 |
| 2015/0314392 A1 * | 11/2015 | Haschke | .............. | B23K 26/043 219/121.64 |
| 2016/0016610 A1 * | 1/2016 | Okada | .................. | B62D 29/007 219/121.64 |
| 2016/0221521 A1 * | 8/2016 | Nishimura | ........... | B23K 9/0026 |
| 2016/0228980 A1 * | 8/2016 | Werz | .................... | B23K 33/002 |
| 2016/0332257 A1 * | 11/2016 | Kawamoto | .......... | B23K 26/244 |
| 2017/0297145 A1 * | 10/2017 | Hosomi | ................ | B23K 26/32 |

FOREIGN PATENT DOCUMENTS

| | | |
|---|---|---|
| CZ | 2011-276 A3 | 1/2012 |
| DE | 10 2010 016945 B3 | 11/2011 |
| EA | 006405 B1 | 12/2005 |
| EP | 0 813 929 A1 | 12/1997 |
| JP | 7-503903 A | 4/1995 |
| JP | 7-178417 A | 7/1995 |
| JP | 2014-15206 | 1/2014 |
| JP | 2014-205166 | 10/2014 |
| JP | 2016-68092 | 5/2016 |
| RU | 2 559 065 C2 | 8/2015 |
| SU | 362674 A1 | 12/1972 |
| WO | WO 2004/007135 A1 | 1/2004 |

OTHER PUBLICATIONS

English translation of the combined Chinese Office Action and Search Report dated May 20, 2020, in Patent Application No. 201810631703.2, 12 pages.

* cited by examiner

METAL MEMBER AND METHOD OF MANUFACTURING THE SAME

INCORPORATION BY REFERENCE

The disclosure of Japanese Patent Application No. 2017-121457 filed on Jun. 21, 2017 including the specification, drawings and abstract is incorporated herein by reference in its entirety.

BACKGROUND

1. Technical Field

The present disclosure relates to a metal member and a method of manufacturing the same.

2. Description of Related Art

Butt welding for making metal members abut against each other and welding the metal members together is known. Japanese Unexamined Patent Application Publication No. 2014-205166 (JP 2014-205166 A) discloses a technique for making flat end surfaces of two metal members having a plate shape abut against each other and joining the metal members together by laser welding. In addition, in the technique described in JP 2014-205166 A, a welding boundary line of a butt portion in which the two metal members having a plate shape abut against each other is a straight line.

FIGS. 13 and 14 are perspective views showing a metal member 501 relating to a problem to be solved. A right-handed xyz coordinate system shown in the drawing is provided for convenience to describe a positional relationship between components.

As shown in FIG. 13, the metal member 501 is obtained by making a first plate 502 and a second plate 503 abut against each other in one butt portion SS1 and welding the first plate 502 and the second plate 503 together. In the butt portion SS1 in which the first plate 502 and the second plate 503 abut against each other, a welding boundary line LL1 between the first plate 502 and the second plate 503 is a straight line connecting a first end PP1 and a second end PP2 of the welding boundary line LL1. In a case where the area of the butt portion SS1, that is, the area of the joint portion in the metal member 501 is not sufficient with respect to a needed joining strength between the first plate 502 and the second plate 503, the joint portion may fracture.

In order to increase the joining strength between the first plate 502 and the second plate 503, a method of increasing the number of butt portions as shown in FIG. 14 can also be considered. In an example shown in FIG. 14, the number of butt portions is three (butt portions SS2, SS3, SS4). However, it may be difficult to increase the number of butt portions due to design limitations.

SUMMARY

The disclosure provides a metal member in which a joining strength of a butt portion between plates joined by butt welding is increased without increasing the number of butt portions of the plates, and a method of manufacturing the same.

A first aspect of the disclosure relates to a metal member. The metal member includes a first plate and a second plate. The second plate abuts against and is welded to the first plate in at least one butt portion. In the butt portion, the length from a first end to a second end of a welding boundary line between the first plate and the second plate is longer than the length of a straight line connecting the first end to the second end of the welding boundary line.

According to the first aspect, during butt welding of the plates abutting against each other, the length of the welding boundary line is set to be longer than the length of the straight line connecting the first end and the second end of the welding boundary line. As a result, the area of the joint portion can be further increased compared to a case where the welding boundary line is a straight line, and thus the joining strength can be further improved.

In the metal member according to the first aspect, the thickness of the first plate and the thickness of the second plate may be different from each other. According to the first aspect, in the metal member, the thickness of a plate used in a portion where the needed strength is relatively high can be made to be relatively large, and the thickness of a plate used in a portion where the needed strength is relatively low can be made to be relatively small. Therefore, the weight of the metal member can be reduced.

In the metal member according to the first aspect, the at least one butt portion may include a first butt portion, a second butt portion, and a curved portion in which the first plate and the second plate abut against and are welded to each other. A first welding boundary line that is a welding boundary line between the first plate and the second plate may be present in the first butt portion, and a second welding boundary line that is a welding boundary line between the first plate and the second plate may be present in the second butt portion. The curved portion may be interposed between the first butt portion and the second butt portion and may connect the first butt portion and the second butt portion to each other. The length from a first end to a second end of the first welding boundary line may be longer than the length of a straight line connecting the first end and the second end of the first welding boundary line. The second welding boundary line may be the shortest line connecting a first end and a second end of the second welding boundary line to each other along a surface of the second plate.

According to the first aspect, during butt welding of the first plate and the second plate, by setting the length from the first end to the second end of the first welding boundary line to be longer than the length of the straight line connecting the first end and the second end to each other, the area of the joint portion can be further increased compared to a case where the welding boundary line is a straight line. As a result, the joining strength can be further improved.

In the metal member according to the first aspect, the second butt portion may include a bent portion having a bending line perpendicular to the second welding boundary line. The first welding boundary line and the curved portion may be on the same side with respect to the bending line. According to the first aspect, in a case where the first welding boundary line and the curved portion are on the same side with respect to the bending line, in the metal member, a protrusion is not formed on the bent portion unlike a case where the curved portion is present in the bent portion. As a result, in a case where the metal member is removed from a bending die after bending, the metal member does not interfere with the bending die in the bent portion.

In the metal member according to the first aspect, an opposite end of the first welding boundary line from the curved portion may be present at a border of the first plate and the second plate. An opposite end of the second welding boundary line from the curved portion may be present at a border of the first plate and the second plate. That is, the first plate and the second plate may be welded in the two butt portions.

A second aspect of the disclosure relates to a method of manufacturing a metal member. The method includes preparing a first plate and a second plate, and making the first plate and the second plate abut against each other in at least one butt portion and welding the first plate and the second plate together. In the butt portion, the length from a first end to a second end of a welding boundary line between the first plate and the second plate is longer than the length of a straight line connecting the first end to the second end of the welding boundary line.

In the method according to the second aspect, the thickness of the first plate and the thickness of the second plate may be different from each other.

In the method according to the second aspect, in the welding, the first plate and the second plate may be made to abut against each other in a first butt portion and a second butt portion and may be welded to each other to form an intermediate product. The method may further include bending the intermediate product formed in the welding. The intermediate product may include a first welding boundary line that is a welding boundary line between the first plate and the second plate in the first butt portion, a second welding boundary line that is a welding boundary line between the first plate and the second plate in the second butt portion, and a curved portion that is interposed between the first butt portion and the second butt portion and connects the first butt portion and the second butt portion to each other. The length from a first end to a second end of the first welding boundary line may be longer than the length of a straight line connecting the first end and the second end of the first welding boundary line. The second welding boundary line may be the shortest line connecting a first end and a second end of the second welding boundary line to each other along a surface of the second plate. In the bending, the intermediate product may be disposed in a bending die such that the second welding boundary line and a bending line are perpendicular to each other and the second welding boundary line is parallel to a direction in which a final product obtained by bending the intermediate product is removed from the bending die and the first welding boundary line and the curved portion are on the same side with respect to the bending line.

According to the second aspect, the first welding boundary line and the curved portion are on the same side with respect to the bending line, in the metal member, and thus a protrusion is not formed on the bent portion unlike a case where the curved portion is present in the bent portion. As a result, in a case where the metal member as a final product is removed from the bending die, the metal member does not interfere with the bending die in the bent portion. Accordingly, the metal member as a final product can be removed from the bending die after bending without interference between the bent portion and the bending die.

According to the aspects, a metal member in which a joining strength of a butt portion between plates joined by butt welding is increased without increasing the number of butt portions of the plates, and a method of manufacturing the same can be provided.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a specific embodiment will be described in detail with reference to the drawings. However, the disclosure is not limited to the following embodiment. In order to clarify the description, the following description and the drawings are appropriately simplified.

Embodiment 1

Figure 1:
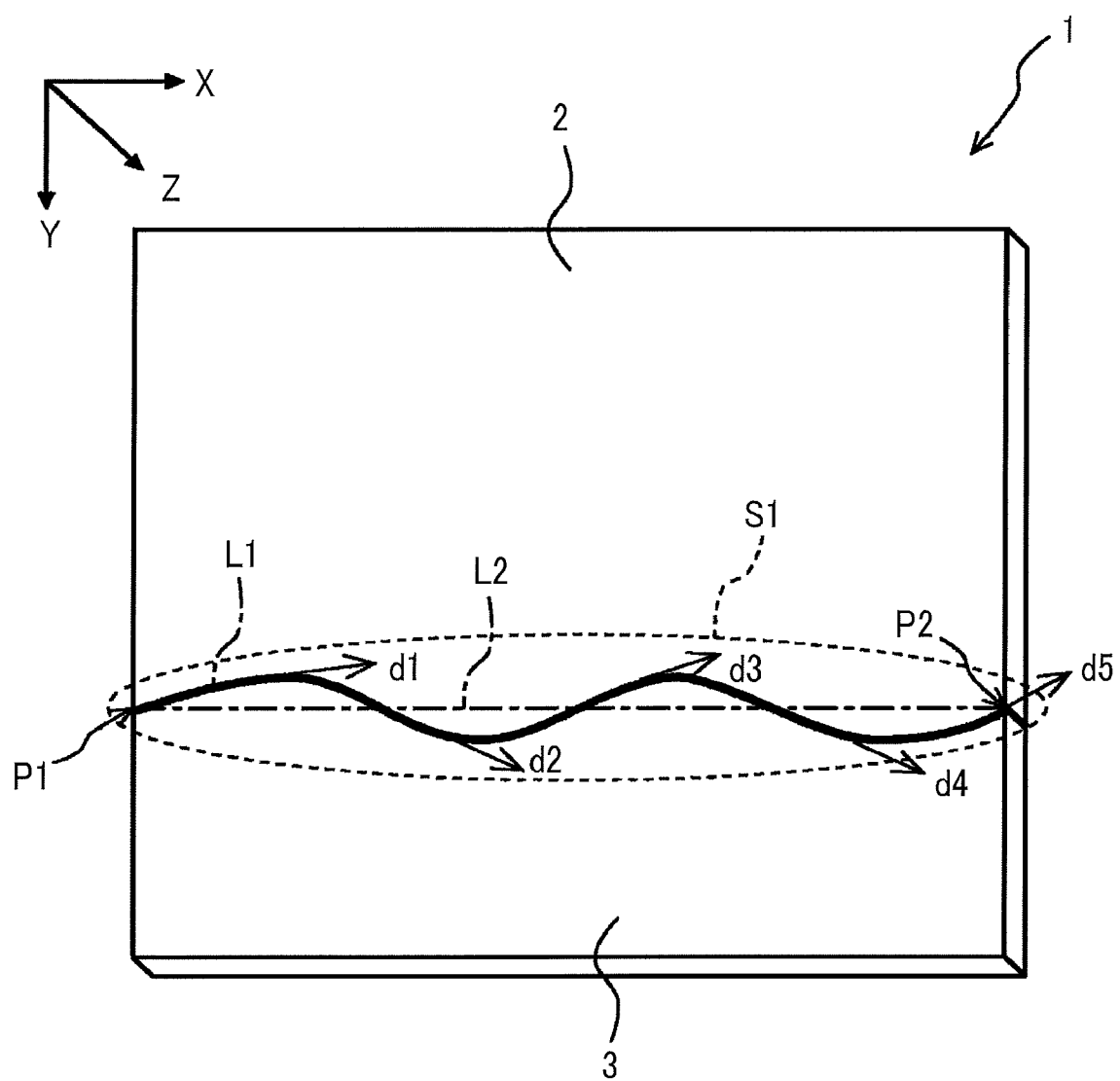
FIG. 1 is a perspective view showing a configuration of a metal member according to Embodiment 1.

First, a configuration of a metal member according to Embodiment 1 will be described with reference to FIG. 1. FIG. 1 is a perspective view showing a configuration of a metal member 1 according to Embodiment 1. A right-handed xyz coordinate system shown in FIG. 1 is provided for convenience to describe a positional relationship between components.

As shown in FIG. 1, the metal member 1 is obtained by making a first plate 2 and a second plate 3 abut against each other in at least one butt portion S1 and welding the first plate 2 and the second plate 3 together. Here, the first plate 2 and the second plate 3 are formed of, for example, base metal such as aluminum, iron, stainless steel, titanium, or magnesium.

In the butt portion S1, a length from a first end P1 to a second end P2 of a welding boundary line L1 between the first plate 2 and the second plate 3 is longer than a length of a straight line L2 connecting the first end P1 and the second end P2 of the welding boundary line L1. Specifically, the welding boundary line L1 is, for example, a wavy curve that oscillates between one side and the other side with respect to the straight line L2.

As described above, during butt welding of plates abutting against each other, by increasing a length of a welding boundary line to be longer than a length of a straight line connecting a first end and a second end of the welding boundary line, the area of the joint portion can be further increased compared to a case where the welding boundary line is a straight line. As a result, the joining strength can be further improved.

In addition, in a case where butt welding progresses from a first end to a second end of a welding boundary line, base metal of the welded portion thermally expands. However, a periphery of the welded portion is cold, and thus the portion that thermally expands due to welding is plastically deformed in a direction in which it is compressed from the periphery and contracts. Further, in a case where the portion that thermally expands due to welding is cooled, the portion pulls the periphery with a strong force. In a case where a welding boundary line is a straight line, a non-welded portion in a butt portion is displaced due to the pulling force. In this portion, the distance between butt end surfaces of plates abutting against each other increases. In a case where the distance between the butt end surfaces increases, it is difficult to weld the plates. Therefore, poor welding is more likely to occur.

On the other hand, in the metal member according to the embodiment, the welding boundary line L1 is longer than the straight line L2 connecting the first end P1 and the second end P2. As a result, the number of tangential directions of the welding boundary line L1 is not one and is plural (directions indicated by arrows d1, d2, d3, d4, d5 in the drawing). With this configuration, even in a case where base metal in a welded portion thermally expands, a non-welded portion in a butt portion is restricted from being displaced due to the pulling force such that the distance between welded end surfaces of plates abutting against each other increases. As described above, poor welding can be effectively suppressed.

Modification Example 1

Figure 2:
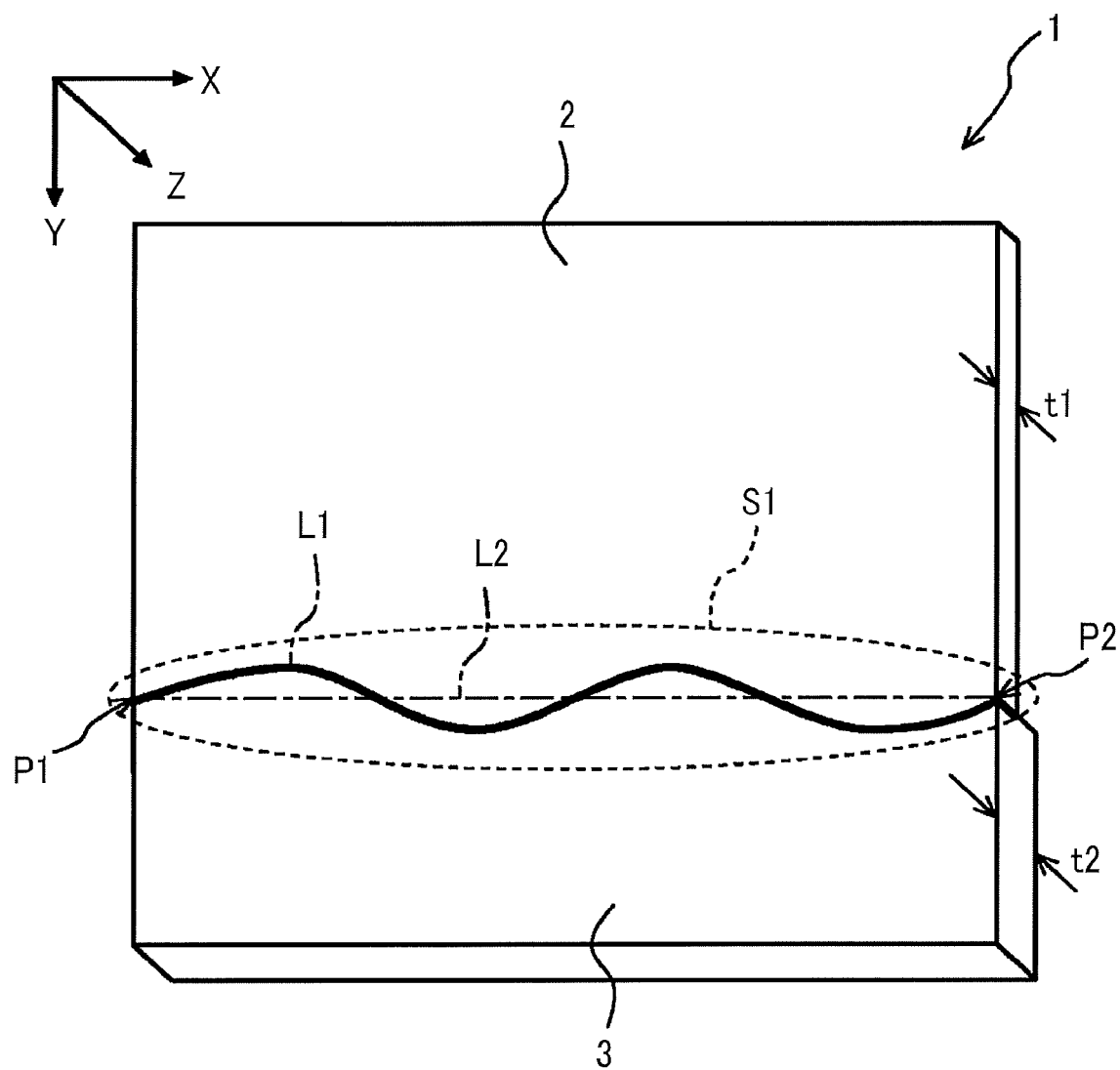
FIG. 2 is a perspective view showing a modification example of the metal member according to Embodiment 1.

FIG. 2 is a perspective view showing a modification example of the metal member 1 according to Embodiment 1. A right-handed xyz coordinate system shown in FIG. 2 matches that in FIG. 1. In the example shown in FIG. 1, the thickness of the first plate 2 and the thickness of the second plate 3 are the same as each other. However, the thickness of the first plate 2 and the thickness of the second plate 3 are not necessarily the same and may be different from each other. As shown in FIG. 2, for example, a thickness t2 of the second plate 3 may be larger than a thickness t1 of the first plate 2 (t2>t1). In the metal member 1, the thickness of a plate used in a portion where the needed strength is relatively high can be made to be relatively large, and the thickness of a plate used in a portion where the needed strength is relatively low can be made to be relatively small. Therefore, the weight of the metal member can be effectively reduced.

In addition, in a case where a welding boundary line is a straight line, in a non-welded portion of a butt portion, the distance between butt end surfaces of plates abutting against each other increases due to thermal expansion of a welded portion. During butt welding of plates having different thicknesses, deformation of a non-welded portion caused by thermal expansion of a welded portion tends to become more significant. Therefore, in a case where a welding boundary line is a straight line during butt welding of plates having different thicknesses, poor welding is more likely to occur. Even during butt welding of plates having different thicknesses, by setting the welding boundary line L1 to be longer than the straight line L2 connecting the first end P1 and the second end P2 as in the case of the metal member 1 according to the embodiment, poor welding can be effectively suppressed.

Embodiment 2

Configuration of Bent Member

Figure 3:
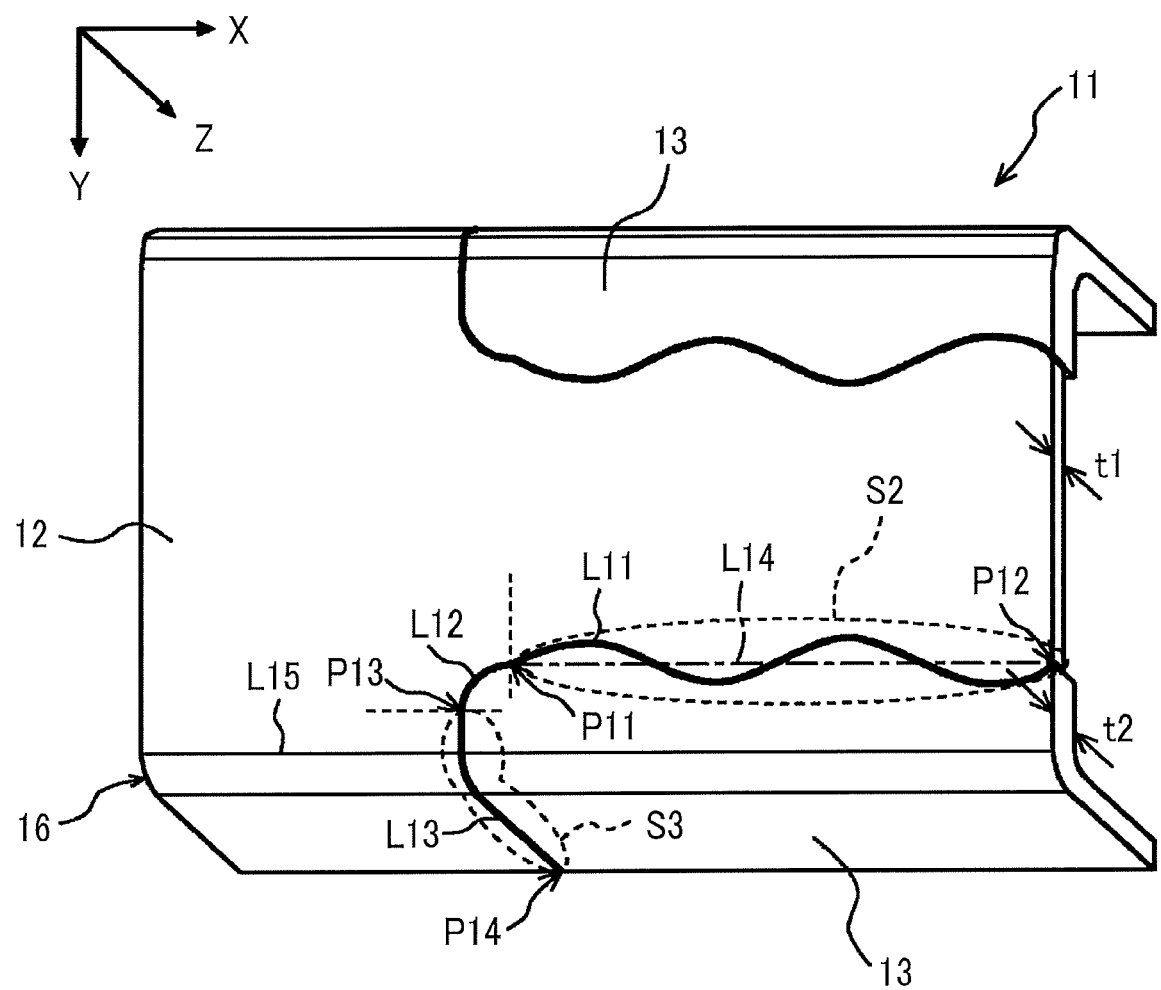
FIG. 3 is a perspective view showing a configuration of a metal member according to Embodiment 2.

First, a configuration of a metal member 11 according to Embodiment 2 will be described with reference to FIG. 3. FIG. 3 is a perspective view showing a configuration of the metal member 11 according to Embodiment 2. The metal member 11 is suitable for, for example, a vehicle frame. A right-handed xyz coordinate system shown FIG. 3 is provided for convenience to describe a positional relationship between components. As shown in FIG. 3, a first plate 12 and a second plate 13 abut against each other and are welded together in a first butt portion S2 and a second butt portion S3. That is, the first plate 12 and the second plate 13 are welded in the two butt portions. Here, the first plate 12 and the second plate 13 are formed of, for example, base metal such as aluminum, iron, stainless steel, titanium, or magnesium.

In the first butt portion S2, a welding boundary line between the first plate 12 and the second plate 13 is set as a first welding boundary line L11. In addition, in the second butt portion S3, a welding boundary line between the first plate 12 and the second plate 13 is set as a second welding boundary line L13. The first welding boundary line L11 and the second welding boundary line L13 are connected to each other through a curved portion L12.

A length from a first end P11 to a second end P12 of the first welding boundary line L11 is longer than a straight line L14 connecting the first end P11 and the second end P12 of the first welding boundary line L11. In addition, the second welding boundary line L13 is the shortest line connecting a first end P13 and a second end P14 of the second welding boundary line L13 to each other along a surface of the second plate 13. An opposite end of the first welding boundary line L11 (the second end P12 of the first welding boundary line L11) from the curved portion L12 is present at a border of the first plate 12 and the second plate 13. In addition, an opposite end of the second welding boundary line L13 (the second end P14 of the second welding boundary line L13) from the curved portion L12 is present at a border of the first plate 12 and the second plate 13.

As described above, during butt welding of the first plate 12 and the second plate 13, by setting the length from the first end P11 to the second end P12 of the first welding boundary line L11 to be longer than the straight line L14 connecting the first end P11 and the second end P12 of the first welding boundary line L11, the area of the joint portion can be further increased compared to a case where the welding boundary line is a straight line. As a result, the joining strength can be further improved. In addition, as described above in Embodiment 1, poor welding caused by thermal expansion of base metal in a welded portion can also be effectively suppressed.

The metal member 11 includes a bent portion 16 having a bending line L15 perpendicular to the second welding boundary line L13. The first welding boundary line L11 and the curved portion L12 are on the same side with respect to the bending line L15. In a case where the metal member 11 is configured as described above, as described below, the metal member 11 as a final product can be removed from a bending die after bending without interference between the bent portion 16 and the bending die.

The thickness of the first plate 12 and the thickness of the second plate 13 may be different from each other. For example, a thickness t2 of the second plate 13 may be larger than a thickness t1 of the first plate 12 (t2>t1). In the metal member 11, the thickness of a plate used in a portion where the needed strength is relatively high can be made to be relatively large, and the thickness of a plate used in a portion where the needed strength is relatively low can be made to be relatively small. Therefore, the weight of the metal member can be effectively reduced. That is, a metal member with a sufficient joining strength and a reduced weight can be provided.

Method of Manufacturing Bent Member

Figure 4:
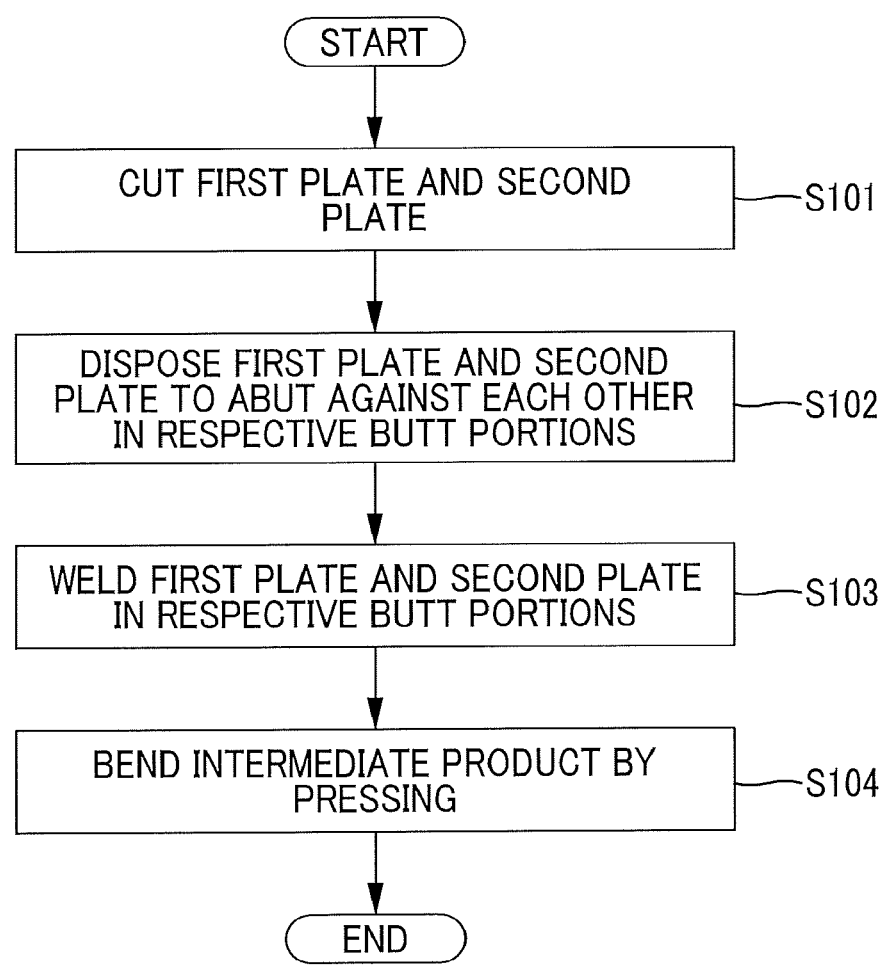
FIG. 4 is a flowchart showing a method of manufacturing the metal member according to Embodiment 2.

A method of manufacturing the metal member 11 according to Embodiment 2 will be described with reference to FIGS. 4 to 8. FIG. 4 is a flowchart showing the method of manufacturing the metal member 11 according to Embodiment 2. FIGS. 5 to 8 are schematic diagrams showing the method of manufacturing the metal member 11 according to Embodiment 2. A right-handed xyz coordinate system shown in FIGS. 5 to 8 matches that in FIG. 3.

Figure 5:
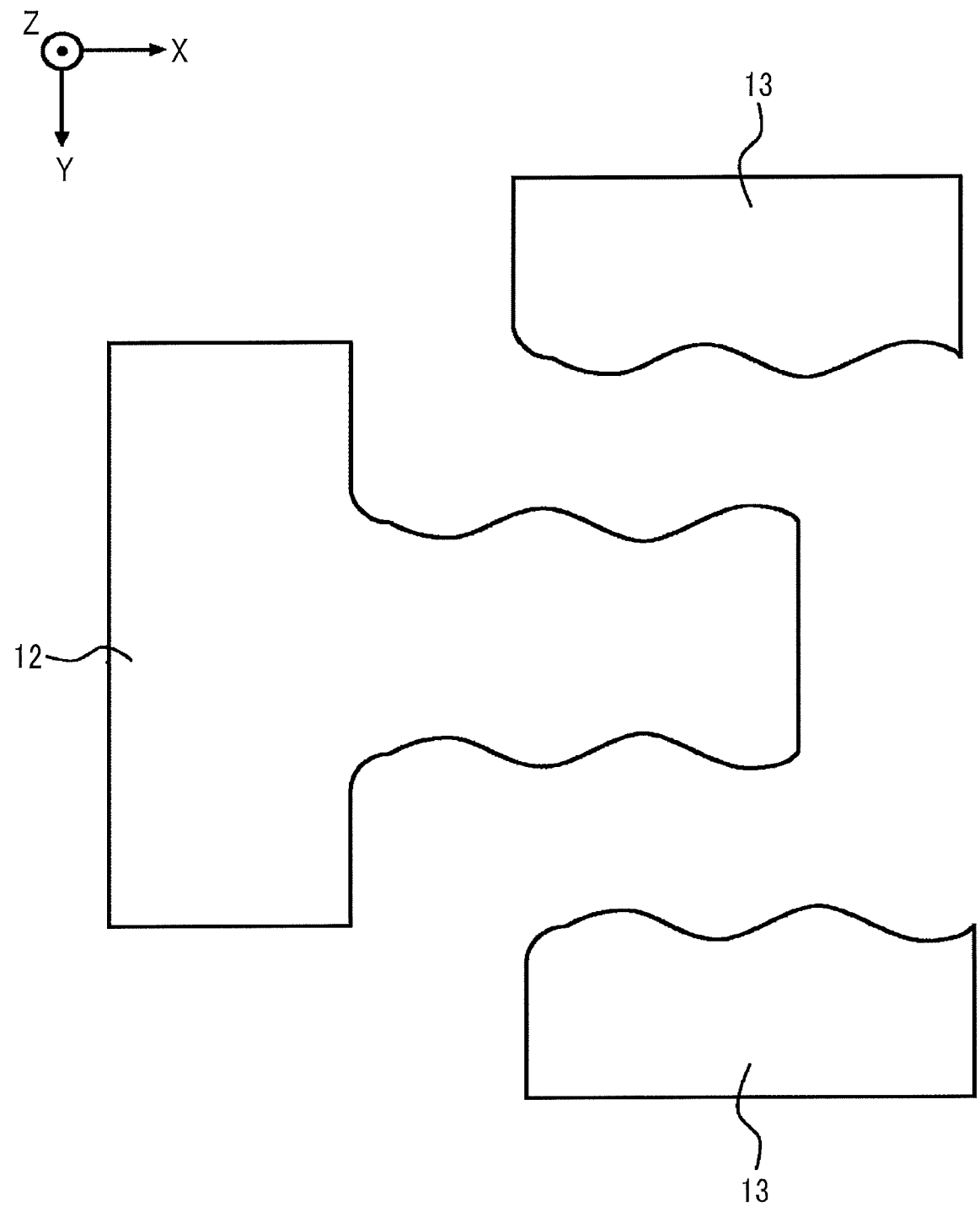
FIG. 5 is a schematic diagram showing the method of manufacturing the metal member according to Embodiment 2.
Figure 6:
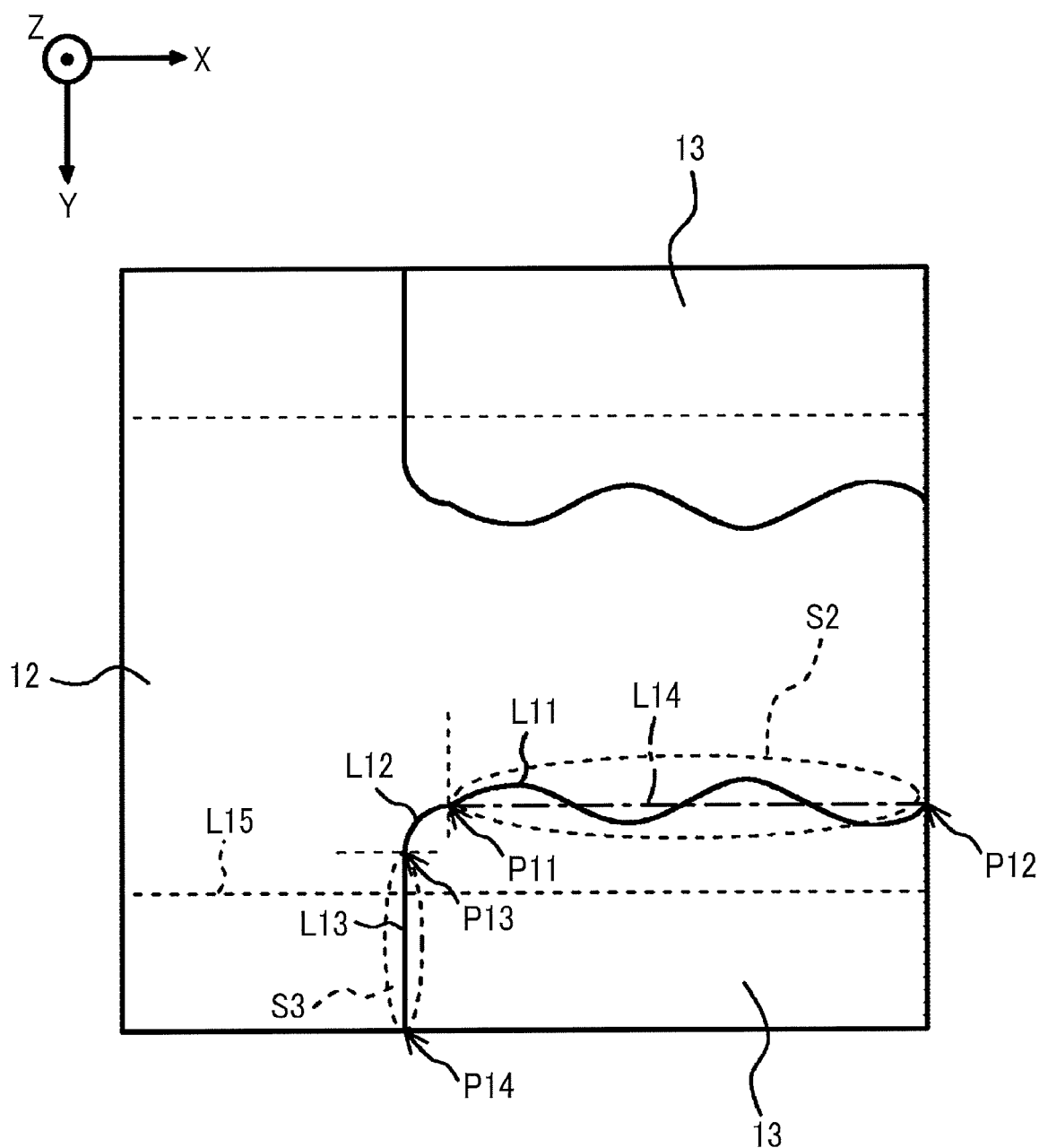
FIG. 6 is a schematic diagram showing the method of manufacturing the metal member according to Embodiment 2.

As shown in FIGS. 4 and 5, first, the first plate 12 and the second plate 13 that are materials constituting the metal member 11 are cut (Step S101). Next, as shown in FIGS. 4 and 6, the first plate 12 and the second plate 13 are disposed to abut against each other in the first butt portion S2 and the second butt portion S3 (Step S102).

Figure 7:
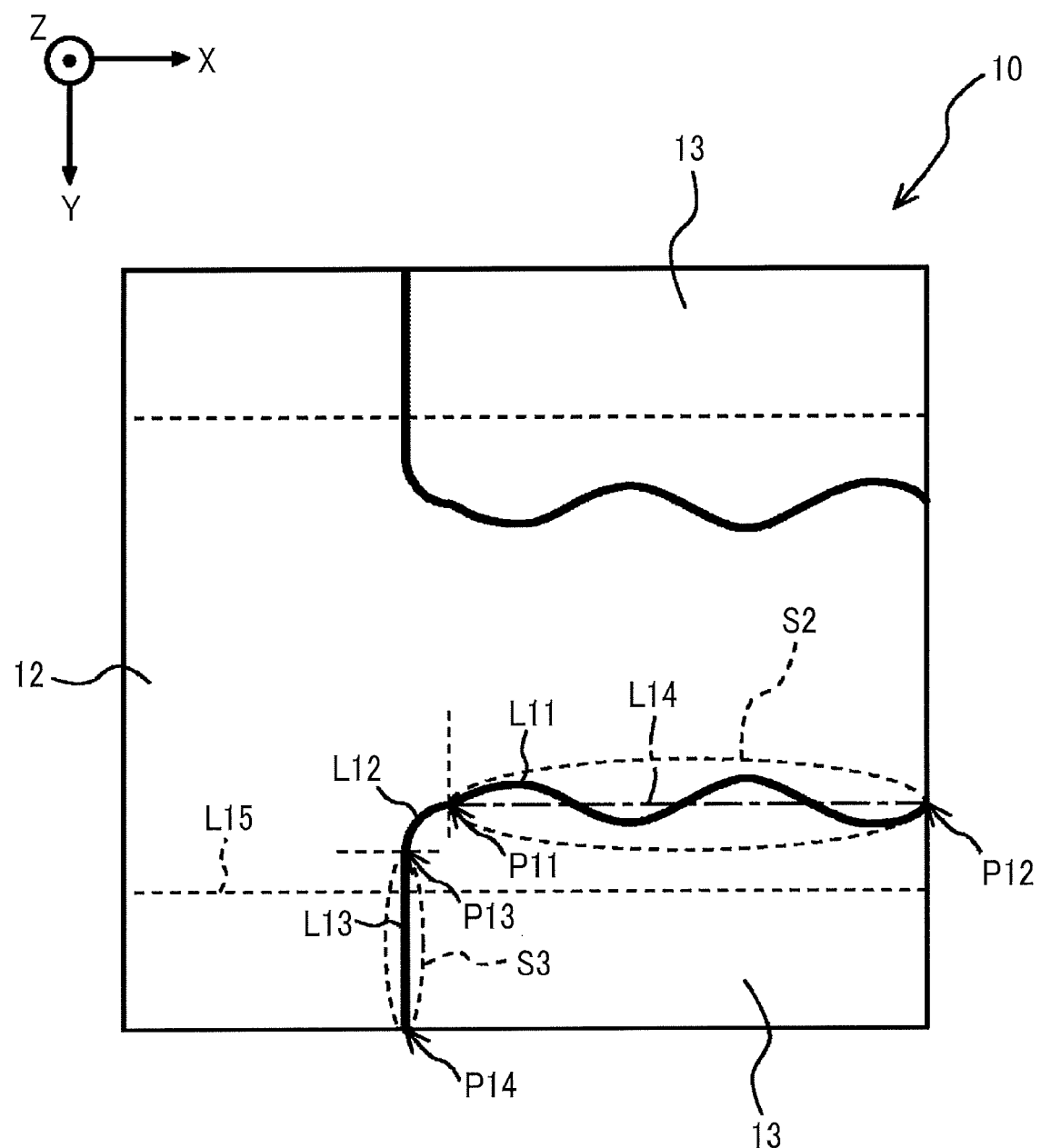
FIG. 7 is a schematic diagram showing the method of manufacturing the metal member according to Embodiment 2.
Figure 8:
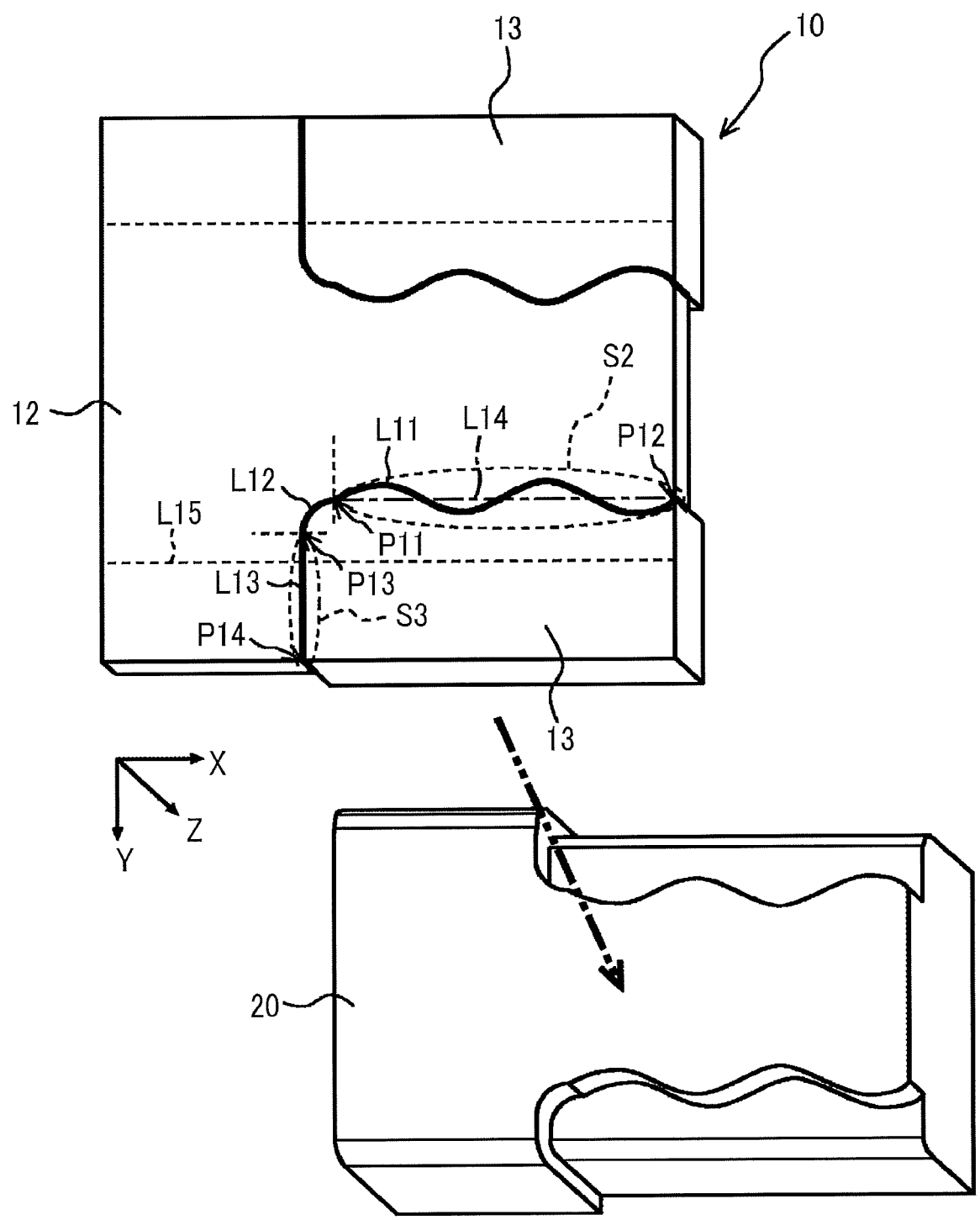
FIG. 8 is a schematic diagram showing the method of manufacturing the metal member according to Embodiment 2.

Next, as shown in FIGS. 4 and 7, the first plate 12 and the second plate 13 are welded together in the respective butt portions to form an intermediate product (Step S103). Here, a welding method is not particularly limited, and laser welding is preferably used from the viewpoint of suppressing thermal strain. As shown in FIGS. 4 and 8, the intermediate product 10 formed in Step S103 is bent by pressing (Step S104). That is, as shown in FIG. 8 the intermediate product 10 is disposed in a bending die 20 and is bent along the predetermined bending line L15.

As shown in FIG. 7, in the intermediate product 10, a welding boundary line between the first plate 12 and the second plate 13 in the first butt portion S2 is set as the first welding boundary line L11, and a welding boundary line between the first plate 12 and the second plate 13 in the second butt portion S3 is set as the second welding boundary line L13. The first welding boundary line L11 and the second welding boundary line L13 are connected to each other through a curved portion L12. A length from a first end P11 to a second end P12 of the first welding boundary line L11 is longer than a straight line L14 connecting the first end P11 and the second end P12 of the first welding boundary line L11. In addition, the second welding boundary line L13 is the shortest line connecting a first end P13 and a second end P14 of the second welding boundary line L13 to each other along a surface of the second plate 13. Further, the bending line L15 is perpendicular to the second welding boundary line L13.

In Step S104 of performing bending shown in FIG. 4, the intermediate product 10 (refer to FIG. 8) is disposed in the bending die 20 such that the second welding boundary line L13 is parallel to a direction in which a final product after bending is removed from the bending die 20 and the first welding boundary line L11 and the curved portion L12 are on the same side with respect to the bending line L15. As a result, the metal member according to Embodiment 2 can be manufactured.

An effect that is obtained in a case where the intermediate product 10 is disposed in the bending die 20 such that the first welding boundary line L11 and the curved portion L12 are on the same side with respect to the bending line L15 will be described below.

Figure 9:
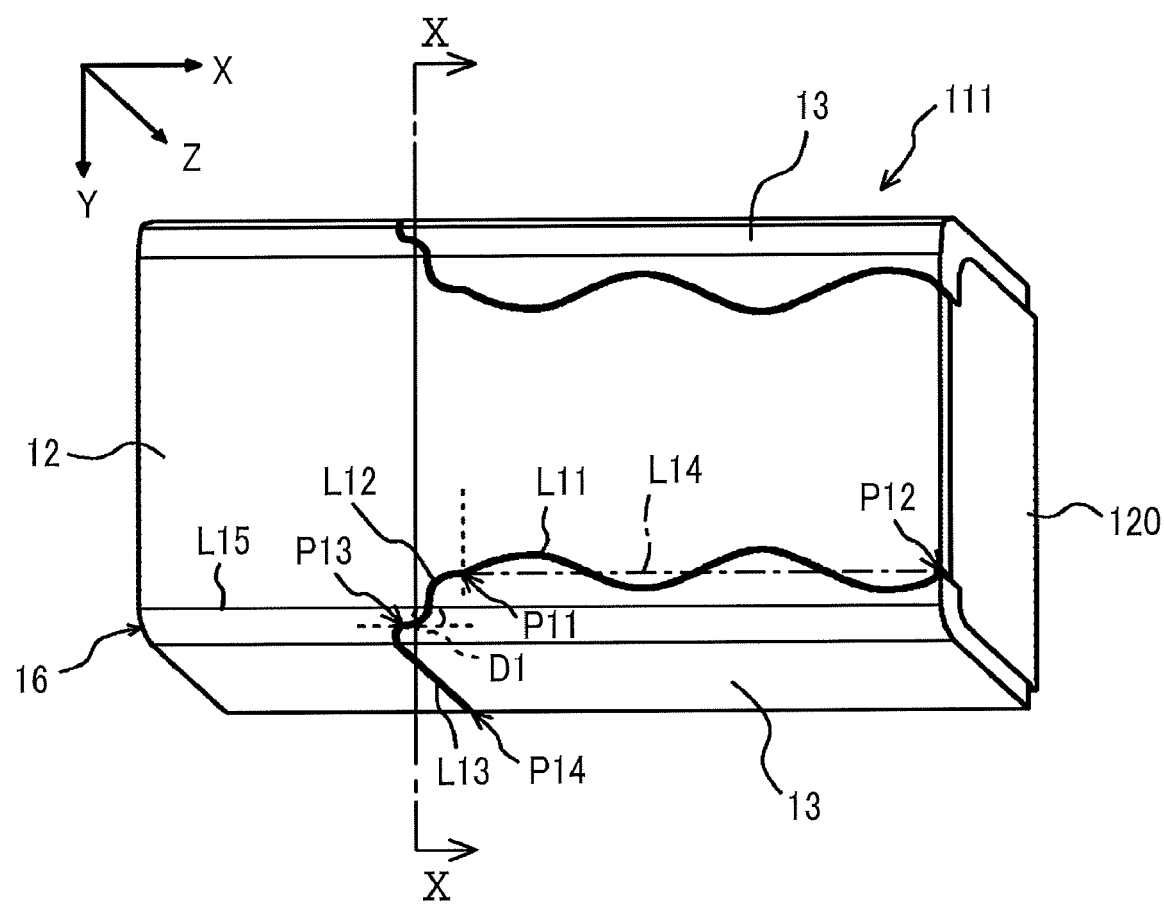
FIG. 9 is a perspective view schematically showing a state before removing a metal member according to Comparative Example from a bending die.
Figure 10:
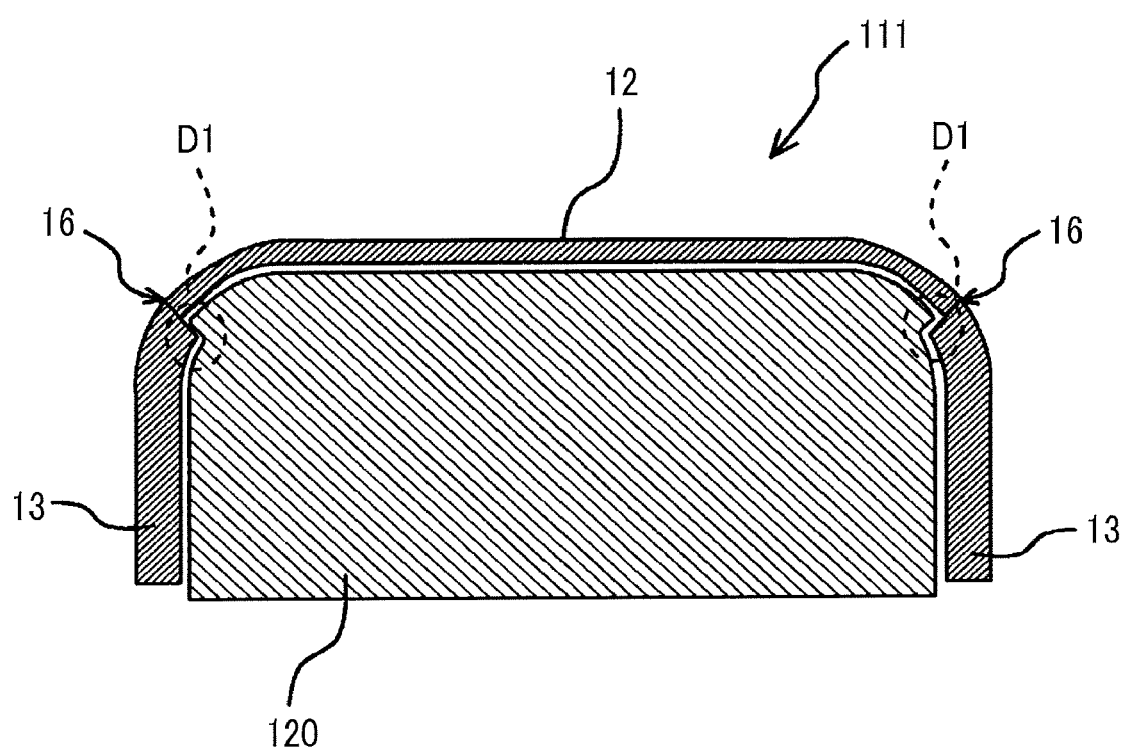
FIG. 10 is a sectional view taken along line X-X of FIG. 9.

FIG. 9 is a perspective view schematically showing a state before removing a metal member 111 according to Comparative Example from a bending die 120. A right-handed xyz coordinate system shown in FIG. 9 matches that in FIG. 3. FIG. 10 is a sectional view taken along line X-X of FIG. 9. As shown in FIG. 9, the bending line L15 intersects the curved portion L12. As a result, as shown in FIG. 10, a protrusion D1 is formed on the bent portion 16 of the metal member 111. As a result, in a case where the metal member 111 as a final product is removed from the bending die 120, the metal member 111 interferes with the bending die 120 at the protrusion D1 of the bent portion 16.

Figure 11:
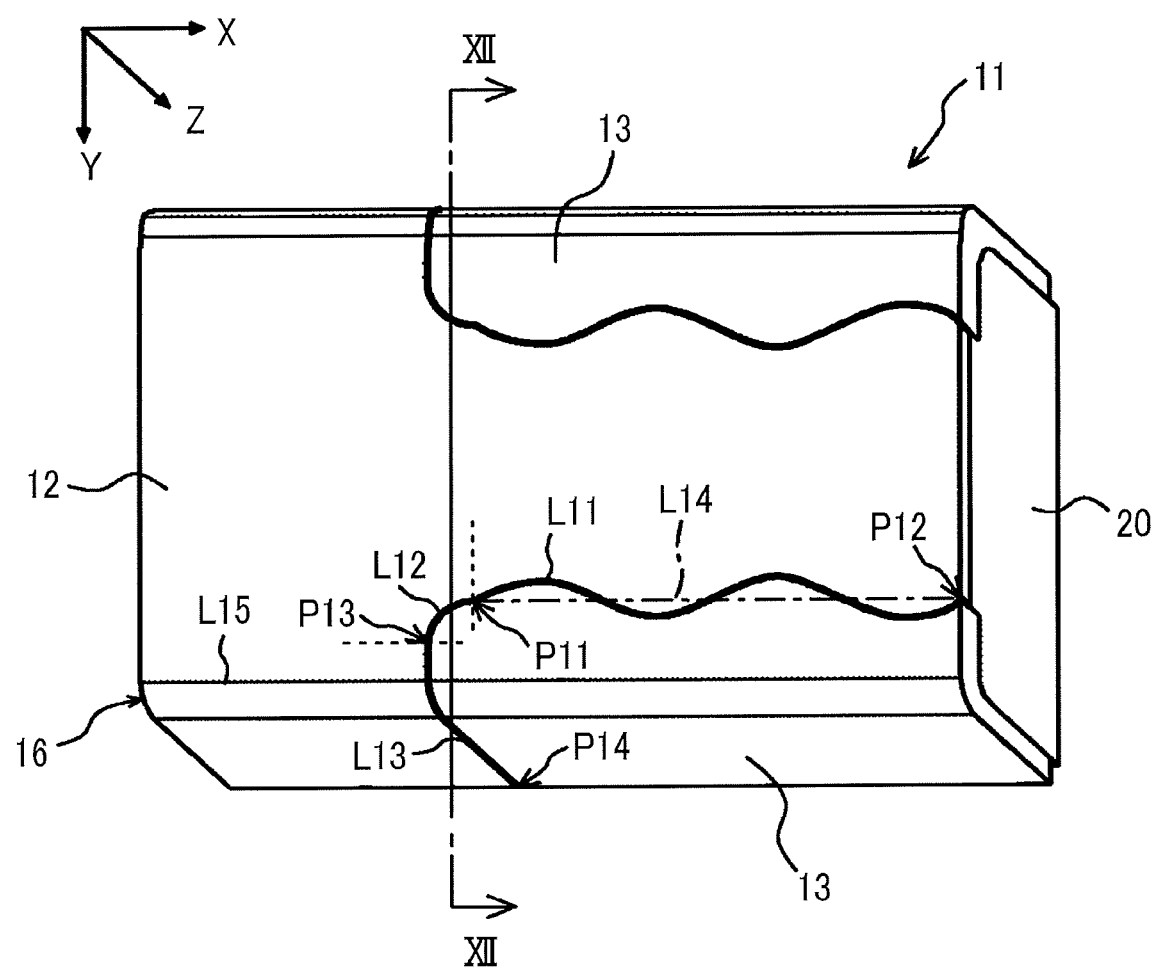
FIG. 11 is a perspective view schematically showing a state before removing the metal member according to Embodiment 2 from the bending die.
Figure 12:
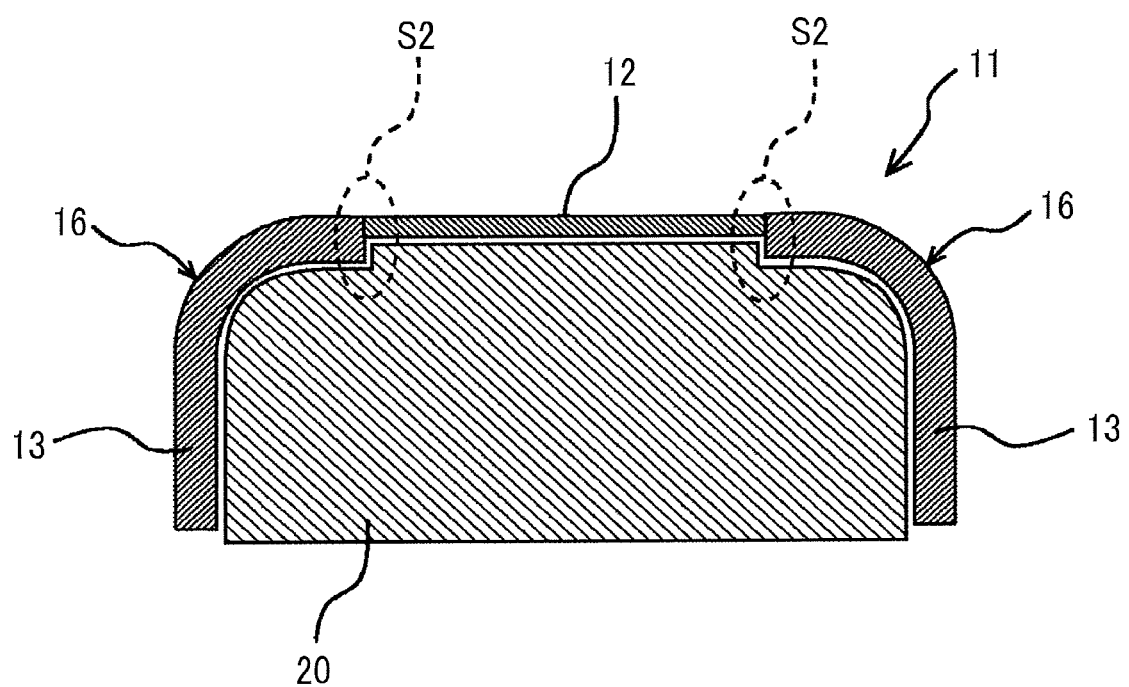
FIG. 12 is a sectional view taken along line XII-XII of FIG. 11.
Figure 13:
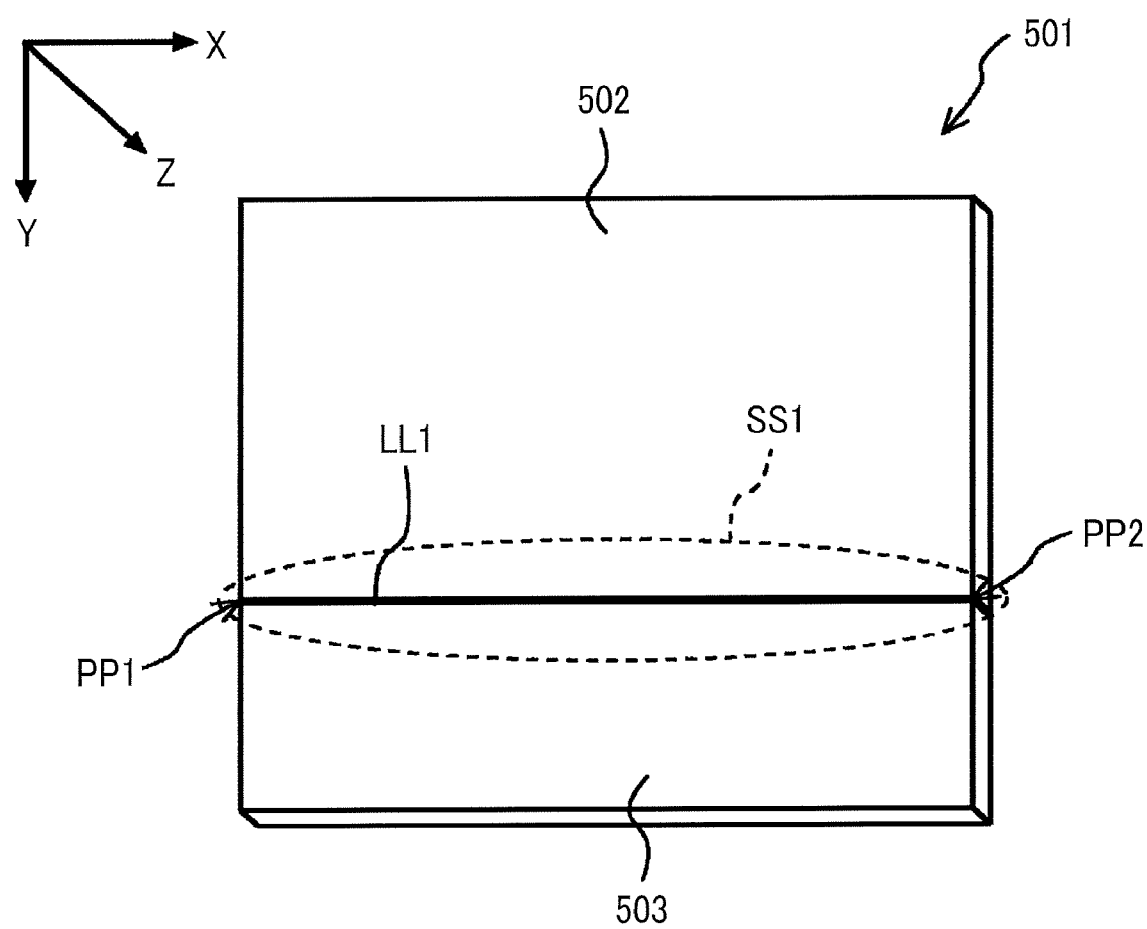
FIG. 13 is a perspective view showing a metal member relating to a problem to be solved.
Figure 14:
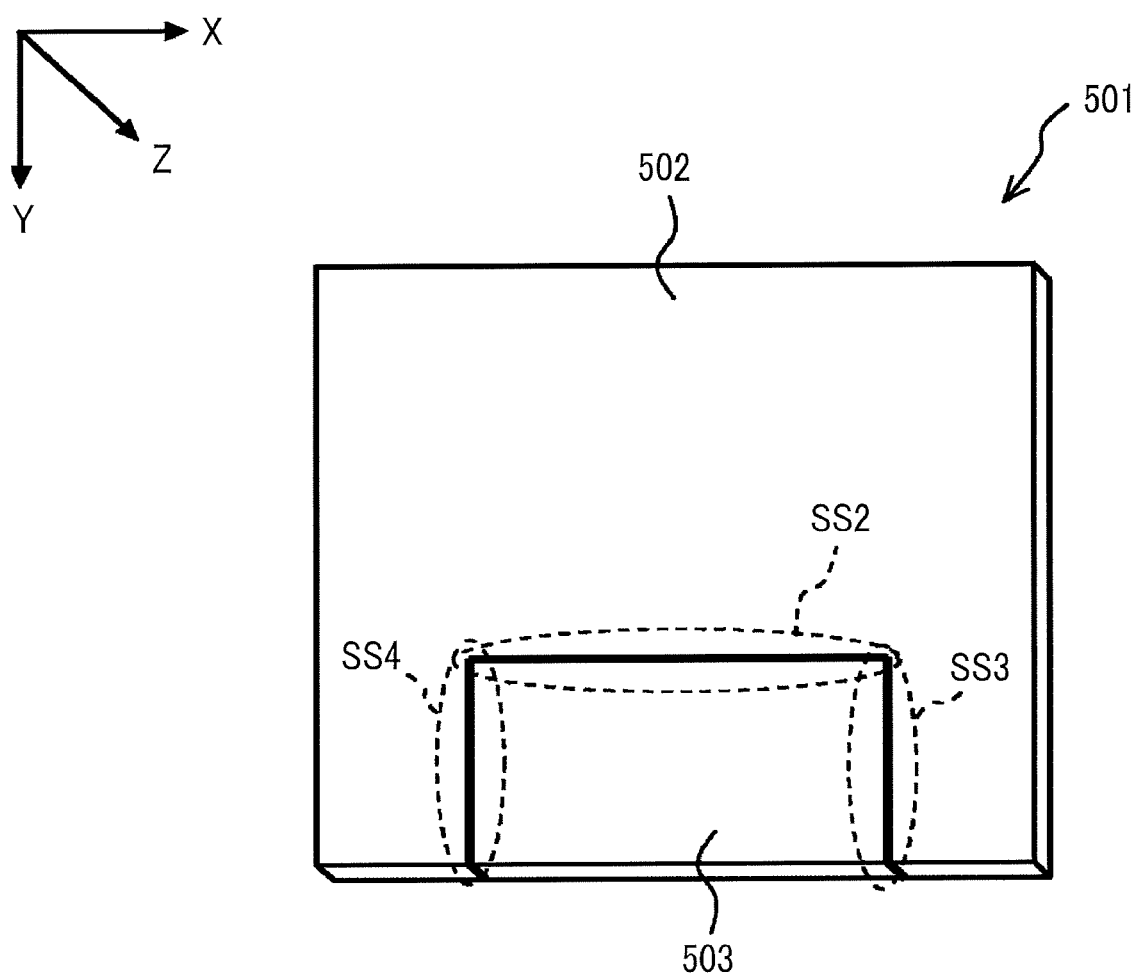
FIG. 14 is a perspective view showing the metal member relating to the problem to be solved.

FIG. 11 is a perspective view schematically showing a state before removing the metal member 11 according to Embodiment 2 from the bending die 20. A right-handed xyz coordinate system shown in FIG. 11 matches that in FIG. 3. FIG. 12 is a sectional view taken along line XII-XII of FIG. 11. As shown in FIG. 11, in the metal member 11, the first welding boundary line L11 and the curved portion L12 are on the same side with respect to the bending line L15. As a result, as shown in FIG. 12, in the metal member 11, the protrusion D1 is not formed on the bent portion 16 unlike in the metal member 111 according to Comparative Example. As a result, in a case where the metal member 11 as a final product is removed from the bending die 20, the metal member 11 does not interfere with the bending die 20 in the bent portion 16. That is, the metal member 11 as a final product can be removed from the bending die 20 after bending without interference between the bent portion 16 and the bending die 20.

The disclosure is not limited to the above-described embodiment, and the embodiment can be appropriately modified.

What is claimed is:

1. A metal member comprising:
   a first plate having an edge surface; and
   a second plate having an edge surface, the edge surface of the second plate abutting against the edge surface of the first plate, the second plate being welded to the first plate in at least one butt portion,
   wherein in the at least one butt portion, a length from a first end to a second end of a welding boundary line between the first plate and the second plate is longer than a length of a straight line connecting the first end to the second end of the welding boundary line;
   the at least one butt portion includes a first butt portion, a second butt portion, and a curved portion in which the edge surface of the first plate and the edge surface of the second plate abut against each other and the first plate and the second plate are welded to each other;
   a first welding boundary line between the first plate and the second plate is present in the first butt portion;
   a second welding boundary line between the first plate and the second plate is present in the second butt portion;
   the curved portion is interposed between the first butt portion and the second butt portion and connects the first butt portion and the second butt portion to each other;

a length from a first end to a second end of the first welding boundary line is longer than a length of a straight line connecting the first end and the second end of the first welding boundary line;

the second welding boundary line is a shortest line connecting a first end and a second end of the second welding boundary line to each other along a surface of the second plate, the edge surface of the first plate extends in a thickness direction of the first plate, the edge surface of the second plate extends in the thickness direction of the second plate, wherein the first plate and the second plate each have a depth dimension having a first value, a length dimension having a second value, and a width dimension having a third value, and the first value is smaller than each of the second value and the third value, and wherein the thickness direction of the first plate is the depth dimension of the first plate, and the thickness direction of the second plate is the depth dimension of the second plate.

2. The metal member according to claim 1, wherein a thickness of the first plate and a thickness of the second plate are different from each other.

3. The metal member according to claim 1, wherein:
the second butt portion includes a bent portion having a bending line perpendicular to the second welding boundary line; and
the first welding boundary line and the curved portion are on the same side with respect to the bending line.

4. The metal member according to claim 1, wherein:
the first end of the first welding boundary line is connected to the curved portion and the second end of the first welding boundary line is present at a border of the first plate and the second plate; and
the first end of the second welding boundary line is connected to the curved portion and the second end of the second welding boundary line is present at a border of the first plate and the second plate.

5. The metal member according to claim 1, wherein the first plate has the edge surface, a first surface which extends in a surface direction of the first plate and is on one side of the first plate, and a second surface which is on the opposite side of the first plate,
wherein the second plate has the edge surface, a first surface which extends in a surface direction of the second plate and is on one side of the second plate, and a second surface which is on the opposite side of the second plate, and
wherein at least one of the first surface of the second plate and the second surface of the second plate is in a thickness range of the first plate.

6. The metal member according to claim 1, wherein the first plate has a first surface which extends in a surface direction of the first plate, the second plate has a first surface which extends in a surface direction of the second plate, the edge surface of the first plate is perpendicular to the first surface of the first plate, and the edge surface of the second plate is perpendicular to the first surface of the second plate.

7. A metal member comprising:
a first plate having an edge surface; and
a second plate having an edge surface, the edge surface of the second plate abutting against the edge surface of the first plate, the second plate being welded to the first plate in at least one butt portion,
wherein in the at least one butt portion, a length from a first end to a second end of a welding boundary line between the first plate and the second plate is longer than a length of a straight line connecting the first end to the second end of the welding boundary line;

the at least one butt portion includes a first butt portion, a second butt portion, and a curved portion in which the edge surface of the first plate and the edge surface of the second plate abut against each other and the first plate and the second plate are welded to each other;
a first welding boundary line between the first plate and the second plate is present in the first butt portion;
a second welding boundary line between the first plate and the second plate is present in the second butt portion;
the curved portion is interposed between the first butt portion and the second butt portion and connects the first butt portion and the second butt portion to each other;
a length from a first end to a second end of the first welding boundary line is longer than a length of a straight line connecting the first end and the second end of the first welding boundary line; and
the second welding boundary line is a shortest line connecting a first end and a second end of the second welding boundary line to each other along a surface of the second plate,
the first plate and the second plate are overlapped in a longitudinal direction of the first plate on an abutting surface between the first plate and the second plate, the longitudinal direction being either a length direction or width direction of the first plate.

8. A metal member comprising:
a first plate having an edge surface; and
a second plate having an edge surface, the edge surface of the second plate abutting against the edge surface of the first plate, the second plate being welded to the first plate in at least one butt portion,
wherein in the at least one butt portion, a length from a first end to a second end of a welding boundary line between the first plate and the second plate is longer than a length of a straight line connecting the first end to the second end of the welding boundary line;
the at least one butt portion includes a first butt portion, a second butt portion, and a curved portion in which the edge surface of the first plate and the edge surface of the second plate abut against each other and the first plate and the second plate are welded to each other;
a first welding boundary line between the first plate and the second plate is present in the first butt portion;
a second welding boundary line between the first plate and the second plate is present in the second butt portion;
the curved portion is interposed between the first butt portion and the second butt portion and connects the first butt portion and the second butt portion to each other;
a length from a first end to a second end of the first welding boundary line is longer than a length of a straight line connecting the first end and the second end of the first welding boundary line; and
the second welding boundary line is a shortest line connecting a first end and a second end of the second welding boundary line to each other along a surface of the second plate,
wherein the first plate has a first thickness, the second plate has a second thickness, such that a total thickness of the metal member is equal to a thicker one of the first thickness and the second thickness.

* * * * *